United States Patent [19]

Miyagawa et al.

[11] Patent Number: 4,876,732

[45] Date of Patent: Oct. 24, 1989

[54] SYSTEM FOR DETECTING ROTATIONAL ANGLE OF OBJECTIVE PATTERN

[75] Inventors: Michiaki Miyagawa; Yutaka Ishizaka; Shoji Shimomura, all of Kanagawa, Japan

[73] Assignee: Fuji Electric Co., Ltd., Kanagawa, Japan

[21] Appl. No.: 50,578

[22] Filed: May 18, 1987

[30] Foreign Application Priority Data

Jun. 4, 1986 [JP] Japan ................................. 61-128032

[51] Int. Cl.⁴ ............................................. G06K 9/36
[52] U.S. Cl. ........................................... 382/41; 382/46
[58] Field of Search .................. 382/8, 27, 28, 41, 45, 382/46; 340/727; 364/463, 559

[56] References Cited

U.S. PATENT DOCUMENTS

| | | | |
|---|---|---|---|
| 4,435,837 | 3/1984 | Abernathy | 382/41 |
| 4,475,122 | 10/1984 | Green | 382/8 |
| 4,499,597 | 2/1985 | Alves | 382/27 |
| 4,658,428 | 4/1987 | Bedros et al. | 382/46 |
| 4,672,676 | 6/1987 | Linger | 382/8 |
| 4,680,802 | 7/1987 | Nishida et al. | 382/8 |
| 4,748,676 | 5/1988 | Miyagawa | 382/46 |

Primary Examiner—Leo H. Boudreau
Attorney, Agent, or Firm—Finnegan, Henderson, Farabow, Garrett & Dunner

[57] ABSTRACT

A system and method for determining a rotational angle of an objective pattern which involves calculating the area A and linear moments $M_x$ and $M_y$ of the pattern from binary picture elements formed after optically sensing the pattern. The picture elements are stored in the memory in binary form. The center of gravity of the objective pattern is calculated on the basis of the area A and the linear moments $M_x$ and $M_y$, and a circular or ring-like search region (a window) is formed about that center of gravity. Thereafter, significant picture information in the search region is extracted from the picture information stored in the memory (in either an inverted or non-inverted state). The rotational angle of the objective pattern is then determined either by using a moment of inertia method or a inter two-gravity centers method calculation. The selection between the moment of inertia method and the inter two-gravity centers method can be performed by means of pre-set switch state information.

4 Claims, 4 Drawing Sheets

SYSTEM FOR DETECTING ROTATIONAL ANGLE OF OBJECTIVE PATTERN

BACKGROUND OF THE INVENTION

The present invention relates generally to an apparatus in which an objective pattern is extracted by an image sensor, such as a television camera, then subjected to image processing to detect a rotational angle in order to inspect or recognize an objective pattern.

One conventional detection system utilizes a method, known as the moment of inertia method of calculation, in which an optically-sensed pattern is binary coded, and in which a main axis and a center of gravity of an equivalent ellipse are obtained from calculations using the linear moments, quadratic moments geometric moments and an area of the binary-coded pattern.

Thus, a rotational angle $\theta$ and a center of gravity $P_G$ ($P_{GX}$, $P_{GY}$) are obtained through the following expressions (1) and (2):

$$\tan 2\theta = 2I_{xy}/(I_y - I_x) \quad (1)$$

$$P_{GX} = M_x/A, \, P_{GY} = M_y/A \quad (2)$$

where the various symbols are defined as follows:
- $M_x$: the linear moment of the pattern with respect to the x-axis;
- $M_y$: the linear moment of the pattern with respect to the y-axis;
- $I_x$: the quadratic moment of the pattern with respect to the x-axis;
- $I_y$: the quadratic moment of the pattern with respect to the y-axis;
- $I_{xy}$: the synergistic moment of the pattern;
- A: the area of the objective pattern; and
- $\theta$: the rotational angle.

Using this moment of inertia method of calculation, the rotational angle $\theta$ can be detected with relatively high accuracy for an elongated objective pattern, but not for an objective pattern which is more square or circular. In square or circular patterns, the quadratic moments $I_x$ and $I_y$ have similar values, and very small errors in quantization of the pattern are magnified when the denominator at the right hand side of the above-mentioned expression (1) approaches zero. Therefore, if rotation of an objective pattern is normalized by using a rotational angle obtained by the moment of inertia method described above, large errors could occur due to the introduction of errors based on shape-dependent calculations rendering any further pattern inspection and recognition of little practical use.

SUMMARY OF THE INVENTION

It is an object of the present invention to provide a system for detecting a rotational angle of an objective pattern in which accurate pattern detection can be achieved without shape-dependent errors.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the method for detecting a rotational angle of an objective pattern comprises the steps of: (a) optically sensing an objective pattern by a picture sensor to form a sense signal; (b) binary coding the sense signal into picture elements; (c) calculating an area of the objective pattern and a plurality of linear moments of the objective pattern from the picture elements; (d) calculating a center of gravity of the objective pattern from the area and the linear moments; (e) storing the area, linear moments, center of gravity and the binary-coded picture elements into a memory; (f) calculating a displacement of the center of gravity corresponding to a difference between a center of gravity of a predetermined standard picture sample and the center of gravity of the objective pattern; (g) determining an appropriate search region from among the binary-coded picture elements and reading out data corresponding to the search region; (h) normalizing a position of the search region: and (i) calculating a rotational angle for the objective pattern based on predetermined mathematical formulae and utilizing the stored information.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Figure 1A:
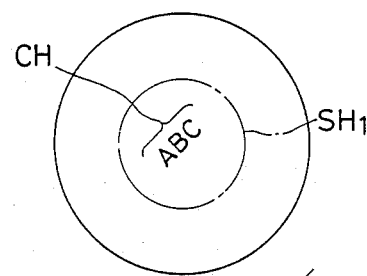
FIGS. 1A, 1B, 2A, 2B, 3A, 3B, 4A and 4B are objective pattern diagrams illustrating principle of the present invention.

Reference will now be made in detail to the present preferred embodiment of the invention, an example of which is illustrated in the accompanying drawings in which like reference characters refer to corresponding elements.

Figure 2A:
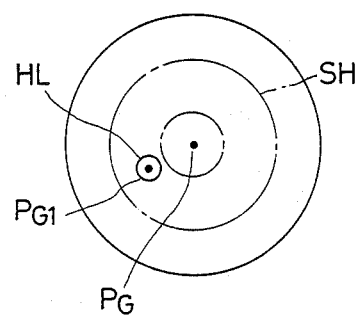

First, referring to FIGS. 1A through 4B, a principle of the present invention called the inter two-gravity center method will be described. FIGS. 1A, 2A, 3A, and 4A each illustrate different objective patterns. Specifically, FIG. 1A illustrates a case where black letters CH are written on a white circular pattern. FIG. 2A illustrates a case where, for example, a hole HL is bored in a white circular pattern similar to the preceding one. FIG. 3A illustrates a case where a notch BL is formed in a white circular pattern similar to FIG. 2A. And FIG. 4A illustrates a case where a protrusion PN is formed on a white circular pattern similar to FIG. 3A. Each of these figures illustrates an example in which it is difficult to detect a rotational angle with high accuracy when using the moment of inertia method of calculation.

Figure 1B:
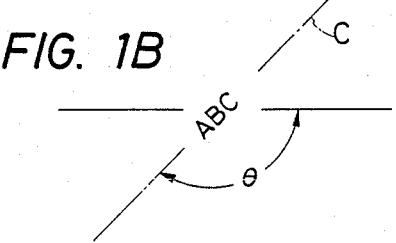

In determining the angle of rotation of the pattern illustrated in FIG. 1A according to the present invention, a circular search region $SH_1$ is chosen, and a picture in this search region, that is, the letter portion CH, is extracted as a significant picture. Next, a main axis C of the significant picture is obtained by using the moment of inertia method of calculation of the letter portion CH as shown in FIG. 1B and a rotational angle $\theta$ is determined as the angle of the main axis. If the search region $SH_1$ is set to be logic "1", the letter portion CH is set to be logic "0", and therefore, it is necessary to invert the logic state or the polarity when the letter portion CH is extracted.

Figure 2B:
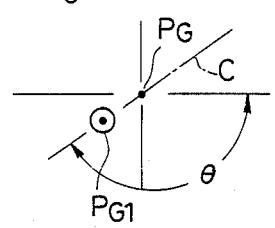
Figure 3A:
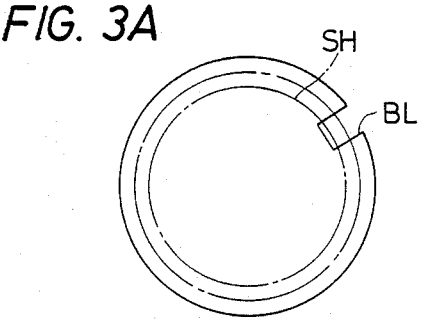
Figure 4A:
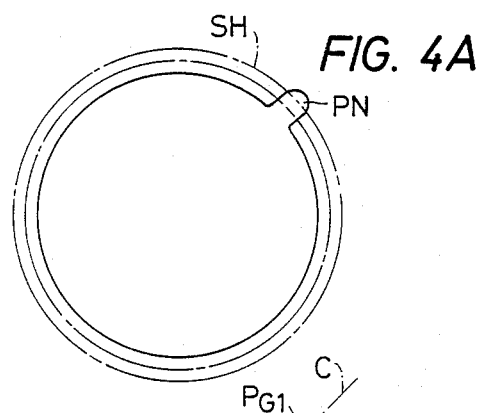

This situation also applies in the cases of FIGS. 2A and 2B, and 3A and 3B. In the case of FIG. 2A, the circular hole HL is extracted as a significant picture, a center of gravity $P_{G1}$ of the picture is obtained. The rotational angle $\theta$ is determined as the angle of a straight line C passing through the center of gravity $P_{G1}$ of the significant picture and the center of gravity $P_G$ of the entire objective pattern as shown in FIG. 2B.

Figure 3B:
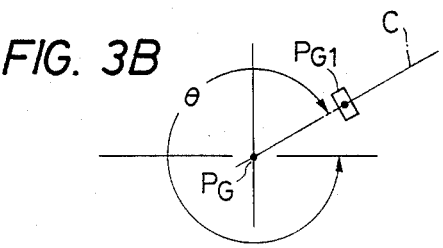
Figure 4B:
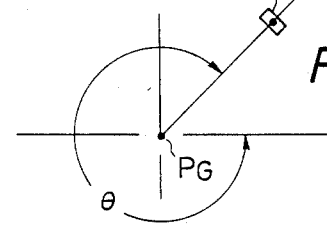

In the case of FIG. 3A, processing is performed with respect to the notch BL in the same manner as in the case of FIG. 2A to obtain a rotational angle $\theta$ as shown in FIG. 3B.

In the case of FIG. 4A, processing is performed in the same manner as in the cases shown in FIGS. 2A and 2B, except that the protrusion PN is extracted without performing an inversion of the polarity or in an inversion of the logic states.

Figure 5:
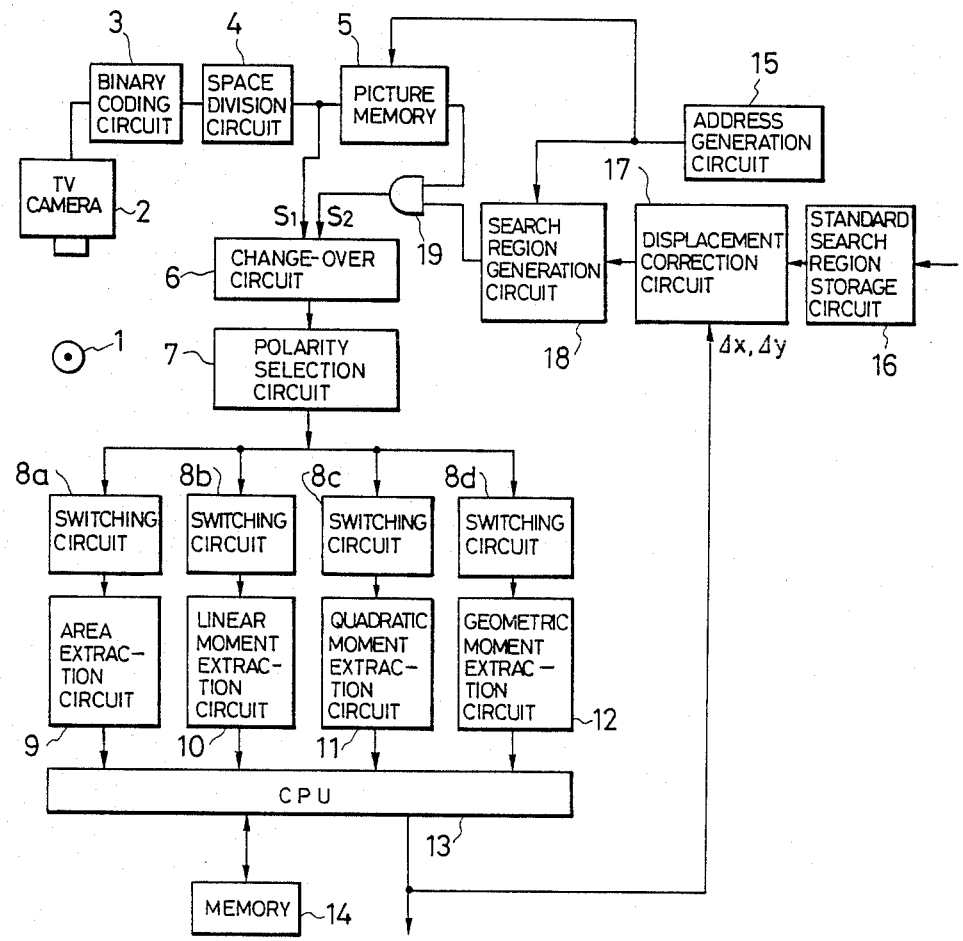
FIG. 5 is a block diagram illustrating a system for detecting a rotational angle of an objective pattern in accordance with a preferred embodiment of the present invention.

Next, the operation of the system of the present invention will be described with reference to FIG. 5. The system has two modes of operation, one being a judging mode (to be explained in greater detail with reference to FIG. 6) and the other mode being a setting mode (to be explained in greater detail with reference to FIG. 7). As shown in FIG. 5, the system according to the present invention includes a pick-up apparatus, such as a television camera 2, for forming a two-dimensional representation of a sample 1 to be detected; a binary coding circuit 3; a space division circuit 4 a picture memory 5; a change-over circuit 6; a polarity selection circuit 7 switching circuits 8a through 8d an area extraction circuit 9; a linear moment extraction circuit 10 a quadratic moment extraction circuit 11; a geometric moment extraction circuit 12; a central processing unit (CPU) 13; a memory 14; an address generation circuit 15; a standard search region storage circuit 16; a displacement correction circuit 17; a search region generation circuit 18; and an AND gate 19.

Figure 6:
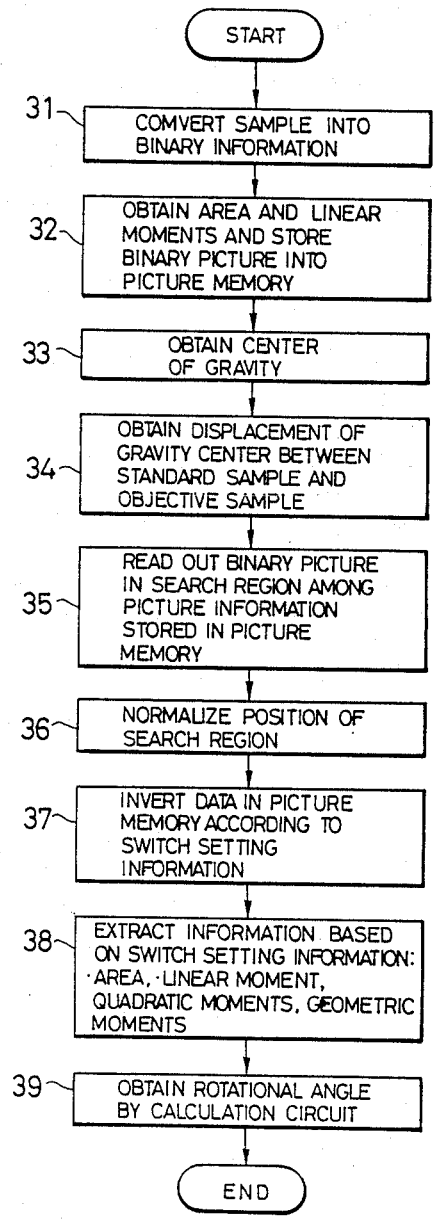
FIG. 6 is a flow chart illustrating the operation of the system of FIG. 5.
Figure 8:
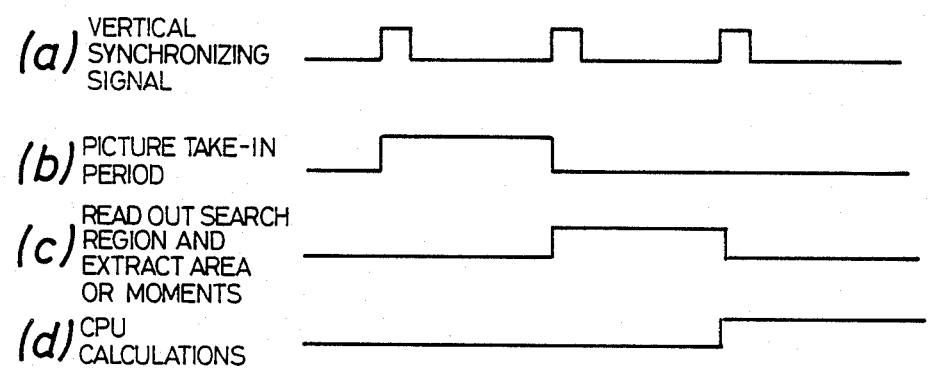
FIG. 8 is a timing diagram for explaining the operation of the embodiment of FIG. 5.

As shown at block 31 in FIG. 6, the detection according to this invention starts with the sample 1 to be detected being sensed by the television camera 2 and converted into binary, that is, black and white, information by the binary coding circuit 3. Next, at block 32, the binary information is spatially divided in two dimensions into picture elements, for example, 256×256 picture elements. These picture elements are then stored in the picture memory 5 which has sufficient capacity to store all of the picture elements. This operation is executed during the period, called the picture take-in period, in which one scene of the picture is scanned by the television camera 2. FIG. 8 shows an example of the relationship between the scanning period and the picture take-in period. FIG. 8(a) shows a vertical synchronizing signal and FIG. 8(b) shows a picture take-in period.

During the picture take-in period, and also shown by block 32 of FIG. 6 the area and linear moments are obtained. These operations are performed under the control of the CPU 13, which causes the change-over circuit 6 to select an input $S_1$ rather than an input $S_2$. The polarity selection circuit 7 selects "forward rotation" thereby turning the switching circuits 8a and 8b "ON" and the switching circuits 8c and 8d "OFF." Therefore, the picture information processed by the space division circuit 4 is applied to the area extraction circuit 9 and the linear moment extraction circuit 10, so that an area A and linear moments $M_x$ and $M_y$ are obtained.

Next, at block 33, when the picture take-in is terminated, the CPU 13 obtains coordinates $P_{GX}$ and $P_{GY}$ of the center of gravity of the entire pattern to be inspected. The CPU 13 can make its determination on the basis of expression (2) or on any other acceptable calculation. Then, as shown by block 34, CPU 13 compares the coordinates $P_{GX}$ and $P_{GY}$ with coordinates $P_{GXS}$ and $P_{GYS}$, which represent the center of gravity of a standard sample obtained in advance during the setting mode. The comparison is performed to obtain a quantity of displacement ($\Delta x$, $\Delta y$) between the center of gravity coordinates.

Figure 7:
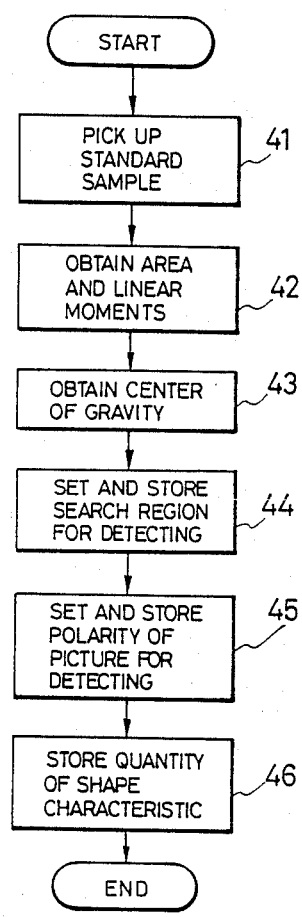
FIG. 7 is a flow chart illustrating a switch setting operation.

Next, as shown by block 35 in FIG. 6, the CPU 13 reads picture polarity information out of the memory 14 corresponding to the shape characteristic of the objective pattern, and applies the information to the polarity selection circuit 7. At the same time, the CPU 13 reads various "ON"/"OFF" switch setting information out of memory 14, and applies that information to the switching circuits 8a through 8d. The process for initially setting the switches is shown in FIG. 7 and described below in detail. The switch setting information for the switching circuits 8a through 8d depends on the algorithm which is used for detecting the angle $\theta$ and the method of calculation, such as the moment of inertia method or the inter two-gravity center method.

Thus, the setting of the switches is performed in accordance with the shape characteristic of the objective pattern. For example, when the moment of inertia method is employed, the switching circuits 8a and 8b are turned "OFF" and the switching circuits 8c and 8d are turned "ON." Information with respect to a circular or ring-like search region to be searched, which had been set in advance by the standard sample, has been stored in the standard-region storage circuit 16 together with the information of the coordinates $P_{GXS}$ and $P_{GYS}$ of the center of gravity of the standard sample.

At this time, as shown by block 35, CPU 13 applies trigger signals to the address generation circuit 15 to scan the picture memory 5 and the search region generation circuit 18. As a result, the address generation circuit 15 generates addresses X and Y to the picture memory 5 to successively scan the picture memory 5 for every picture element in a manner similar to a television, so as to successively read picture information out of picture memory 5. The search region generation circuit 18 is arranged to read search region data (coordinates data) out of the standard search region stored circuit 16 to determine whether addresses generated by the address generation circuit 15 exist in the search region. Accordingly, the search region generation circuit 18 controls the data read out of picture memory 5 through the AND gate 19. Thus, only the picture data in the search region stored in picture memory 5 are read out through the AND gate 19.

Then, at block 36, the quantity of displacement ($\Delta x$, $\Delta y$) between the respective centers of gravity of the pattern to be detected in the standard sample is applied from CPU 13 to the displacement correction circuit 17. The quantity of displacement is added to the data from the standard search region storage circuit 16 to thereby shift position of the standard search region by the quantity of displacement so that the position of the search region is normalized.

The change-over circuit 6 is then controlled to select an input $S_2$ at block 37, so that the output of the AND gate 19 is applied to the extraction circuits 9 through 12 via the changeover circuit 6, the polarity selection circuit 7, and the switching circuits 8. At this time, as shown in block 37, the polarity of the picture information is inverted if necessary.

As described above, since the moment of inertia method is to be used in this case, only the switching circuits 8c and 8d are in the "ON" state, so that the quadratic moments $I_x$ and $I_y$ and the synergistic moment $I_{xy}$ are extracted by the extraction circuits 11 and 12, respectively (block 38). FIG. 8(c) shows the timing of the preceding operation. As is apparent from FIG. 8(c), extraction of the area and the moments with respect to the significant picture information is performed after the picture take-in period.

As shown by block 39 of FIG. 6, the outputs of the extraction circuits 11 and 12 are applied to the CPU 13, so that the calculation shown in the above-mentioned expression (1) is performed in accordance with the setting of the switches to obtain the rotational angle $\theta$. The timing for the operation which occurs at block 39 is shown in FIG. 8(d).

The rotational angle is thus obtained by using the moment of the inertia method of the preceding example. As described above, there are some shapes of the objective pattern for which the rotational angle can be more accurately obtained by using the inter two-gravity center method and some cases where the rotational angle can be more accurately obtained by using the polarity inversion of the picture information method.

Therefore, the status of the switches is set in advance and stored in memory 14 using a standard sample according to which method should be used and according to whether the polarity of picture information should be inverted. As shown in FIG. 7, at block 41, a standard picture sample is obtained and then binary-coded similar to the procedure in block 31 of FIG. 6. Next, at block 42, CPU 13 calculates the area and linear moments of the binary-coded picture similar to the procedure in block 32 of FIG. 6. At block 43, CPU 13 calculates the center of gravity similar to the procedure in block 33 of FIG. 6, and at block 44, CPU 13 determines the search region and stores it in memory 14. The polarity of the picture information is determined and stored in memory 14 at block 45, then, at block 46, the switch states are determined and set and stored in memory 14.

When the inter two-gravity center method and the polarity inversion of the picture information are to be used, CPU 13 applies a command indicating the polarity inversion to the polarity selection circuit 7, applies a command turning the switching circuits 8a and 8b "ON", and applies a command turning the switching circuits 8c and 8d "OFF." As a result, an area A' and linear moments $M'_x$ and $M'_y$ are extracted from the information of the significant picture in the search region, and the center of gravity is obtained on the basis of the above-mentioned expression (2).

Therefore, a rotational angle $\theta$ can be obtained from the thus-obtained center of gravity of the pattern in the search region and the center of gravity of the entire pattern to be detected on the basis of the following expression (3):

$$\theta = \tan^{-1} \frac{Y_{Gi} - Y'_{Gi}}{X_{Gi} - X'_{Gi}} \quad (3)$$

where $X_{Gi}$ and $Y_{Gi}$ are the respective x- and y- coordinates of the center of gravity of the entire pattern to be detected, and $X'_{Gi}$ and $Y'_{Gi}$ represent the x- and y-coordinates of the center of gravity of the pattern in the search region.

The preceding description of the system in accordance with the present invention has been mainly concerned with objective patterns having only one kind of shape characteristic. If an objective pattern has various shape characteristics, it is possible to use the present invention with respect to portions of such an objective pattern so that data relating to sizes and positions of standard search regions, methods of angle detection, polarity of picture, etc., are set and stored in advance so that the data can be properly selected by CPU 13.

The following advantages result from the use of the system of the present invention:

(1) Since angle detection with respect to an objective pattern is made by extracting the data of a significant picture in a search region, a correct angle can be detected even where a circular pattern is to be normalized. Accordingly, normalization of rotation in pattern inspection or pattern recognition can be more accurately performed. Furthermore, in a case where angle data are to be detected so as to be utilized for position control, position information can be obtained thereby making it possible to perform highly accurate position control.

(2) Since the angle detection can be performed by using one of several different methods and the picture polarity can be suitably changed, the system according to the present invention can widely apply to various samples with various shape characteristics.

(3) Furthermore, since the size of the search region can be suitably set, the system according to the present invention can deal with various objective samples, so that the system can operate as a flexible manufacturing system (FMS).

(4) Since the displacement of the position where the search region is generated can be corrected, not only can the inspection and recognition be performed with high accuracy independent of the region's displacement, but also the limitation in a carrying system caused by an objective sample is reduced resulting in a reduction in the cost of the carrying system.

It will be apparent to those skilled in the art that various modifications and variations can be made in the methods and apparatus of the present invention without departing from the scope or spirit of the invention. Thus, it is intended that the present invention cover the modifications and variations of this invention provided they come within the scope of the appended claims and their equivalents.

What is claimed is:

1. A method for detecting a rotational angle of an objective pattern comprising the steps of:
    (a) optically sensing an objective pattern by a picture sensor to form a sense signal;
    (b) binary coding said sense signal into picture elements;
    (c) calculating an area of said objective pattern and a plurality of linear moments of said objective pattern from said picture elements;

(d) calculating a center of gravity of said objective pattern from said area and said linear moments;
(e) storing said area, linear moments, center of gravity and said binary-coded picture elements into a memory;
(f) calculating a displacement of said center of gravity corresponding to a difference between a center of gravity of a predetermined picture sample and said center of gravity of said objective pattern;
(g) determining an appropriate search region from among said binary-coded picture elements and reading out data corresponding to said search region;
(h) normalizing a position of said search region;
(i) calculating a rotational angle for said objective pattern based on predetermined mathematical formulae and utilizing said stored information; and
(j) storing predetermined data for determining whether said logic state of said picture information is to be inverted, and as to which one of said methods of calculation are to be used in detection of said rotational angle of said objective pattern.

2. The method of claim 1, further including the step of forming a search region by using a normalization process.

3. A system for detecting a rotational angle of a two-dimensional objective pattern converted into binary picture information, said system comprising:
   memory means for storing said picture information;
   first feature extraction means for extracting an area and a moment of inertia of said objective pattern from said picture information;
   center of gravity means for determining a center of gravity of said objective pattern from said area and said moment of inertia of said objective pattern;
   region forming means performing a search region having a predetermined shape about said center of gravity of said pattern;
   second feature extraction means for extracting a selective portion of said picture information out of said memory means, whereby said rotational angle of said objective pattern is detected on the basis of said extracted portion by using a selected one of a moment of inertia method or an inter two-centers of gravity method of calculation; and
   predetermined data storage means for determining whether said logic state of said picture information is to be inverted, and as to which one of said methods of calculation are to be used in detection of said rotational angle of said objective pattern.

4. A system for detecting rotational angle of an objective pattern according to claim 3, in which said search region is formed by using a normalization process.

* * * * *